July 27, 1937.　　　　A. L. VOIGHT　　　　2,088,073

BEER DISPENSER

Filed Jan. 8, 1936

INVENTOR.

AUGUST L. VOIGHT

BY Kwis Hudson & Kent

ATTORNEYS

Patented July 27, 1937

2,088,073

UNITED STATES PATENT OFFICE 2,088,073

BEER DISPENSER

August L. Voight, Cleveland, Ohio

Application January 8, 1936, Serial No. 58,125

4 Claims. (Cl. 225—1)

This invention relates to a device for dispensing beverages such as beer. An object of the invention is to provide a device for dispensing beverages such as beer, which functions so that each glass of the beverage which is drawn will be alike and will have the desired amount of foam or "collar" in that the pressure in the beer is definitely controlled to prevent excess of pressure or wild beer.

A further object is to provide a device for dispensing beverages, such as beer and wherein the pressure in the beverage or beer withdrawn will be a fixed and predetermined amount irrespective of pressures in the barrels or containers from which the beverage is conducted to the device.

Another object is to provide a device for dispensing beverages such as beer, wherein the characteristics of the beverage will be so controlled as to eliminate waste in the dispensing thereof.

A still further object is to provide a device for dispensing a beverage such as beer, wherein a large number of glasses of the beverage may be rapidly drawn and the beverage in each glass will have substantially the same characteristics.

Another object is to provide a device for dispensing a beverage such as beer, whereby an unskilled operator can readily withdraw a glass of the beverage so that the beverage will have the desired characteristics.

Another object is to provide a device of the character specified, in which the beverage may remain for considerable periods of time, such as overnight, without going flat or otherwise losing its desirable properties.

A further object is to provide a device for dispensing a beverage, such as beer, which is so constructed that the beverage will derive the greatest benefit from the coolant which surrounds the device, wherefore properly cooled glasses of the beverage can be withdrawn from the device.

An additional object is to provide a device of the character specified, which is simple in construction and economical to manufacture.

Further and additional objects and advantages will appear hereinafter during the following detailed description of an embodiment of the invention which is illustrated in the accompanying drawing, wherein Fig. 1 is an elevational view of a device embodying the invention.

Figure 3:
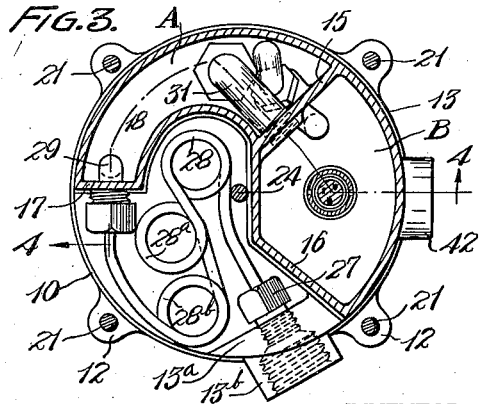
Fig. 3 is a transverse horizontal sectional view taken substantially on line 3—3 of Fig. 1 looking in the direction of the arrows.

The device comprises a substantially cup-shaped base member 10 provided with feet 11 and having radially extending lugs 12 spaced circumferentially of its periphery for a purpose later to be explained. The base member 10 receives and supports the lower end of an arcuate shaped container 13 the bottom edge of the walls of said container engaging suitable gaskets 14 mounted in a recess in the base 10. The container 13 is provided with two compartments A and B separated by a dividing wall 15 and enclosed by an irregularly shaped wall integrally connected with the ends of the arcuate container, as clearly indicated in Fig. 3, and comprising annular disposed portions 16 and 17 and a reentrant curved portion 18, for a purpose later to be explained, it being noted that the container 13 only covers a portion of the base 10, wherefore an irregularly shaped space is provided between the base 10 and the cover 19 at one side of the container 13. The cover 19 is cup-shaped, similarly to the base 10 and is provided with a plurality of circumferentially spaced radially projecting lugs 20, lying in vertical alignment with the lugs 12 of the base. The lugs 12 and 20 are provided with openings in which are located vertically extending rods 21 threaded on their upper ends to receive wing nuts 22, whereby the base, container and cover can be firmly clamped to form a unitary structure, it being noted that suitable gaskets 23 are located inside of the cover and engage with the upper edge of the container.

In addition to the rods 21 the parts of the device are further held in assembled relationship by means of a rod 24 connecting the base 10 and cover 19 and extending centrally through the device but outside of the container 13 and receiving on its upper threaded end a wing nut 24a.

Figure 2:
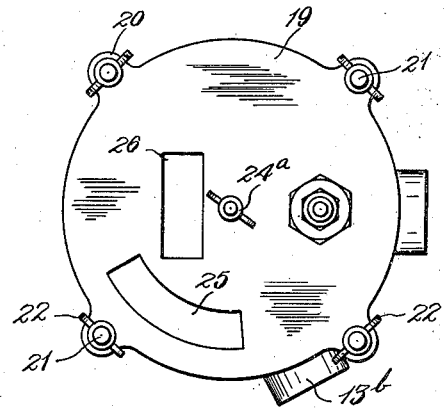
Fig. 2 is a top plan view of the device shown in Fig. 1.
Figure 4:
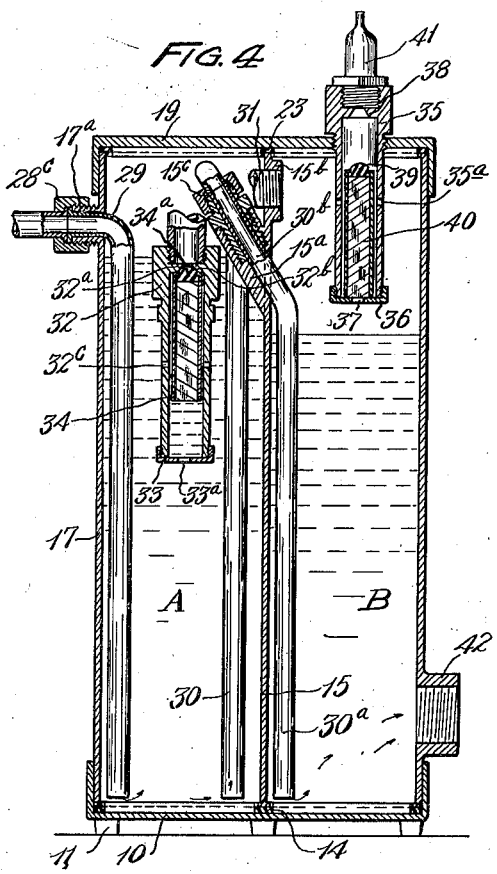
Fig. 4 is an irregular transverse vertical sectional view taken substantially on the irregular section line 4—4 of Fig. 3 looking in the direction of the arrows.
Figure 1:
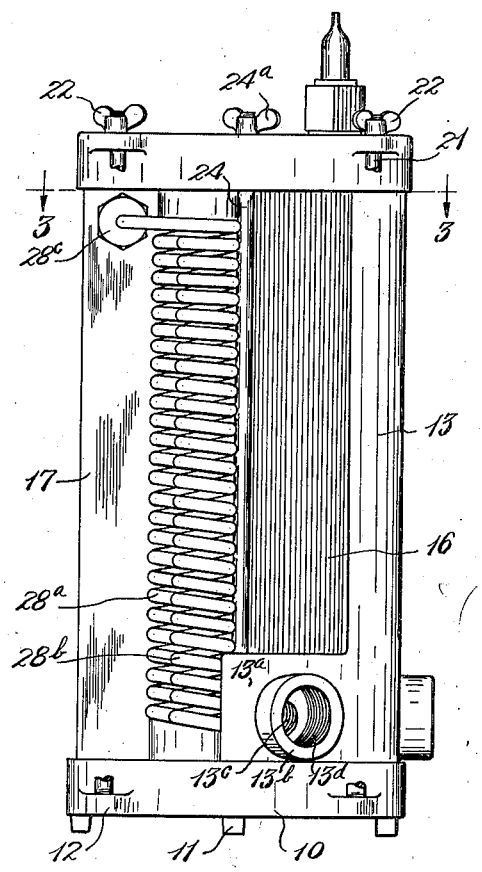

It will be understood that the device is positioned as a unit in a suitable coolant containing receptacle and that the coolant completely surrounds the device and is in contact with all the walls of the container 13, it being noted that the cover 19 is provided with openings 25 and 26, so that the coolant not only can pass into the open space at the side of the device and into engagement with the walls 16, 17 and 18 from the side of the device but may also pass downwardly into such space through the openings 25 and 26. The lower end of the container 13 is provided with an extended arcuate portion 13a having a suitable boss 13b formed thereon and provided with a threaded bore 13c and a threaded counter-bore 13d. The counter-bore 13d receives a suitable fitting carried by a conduit that is connected to the barrel or container of the beverage and such barrel or container may be located in any desired place as will be well understood in the art. The bore 13c is connected by a suitable fitting 27 to a plurality of coils 28, 28a and 28b located above the base 10 and in the space at one side of the container 13. The coils just referred to will be formed of suitable tubing and the first coil, namely, the coil 28 will extend upwardly and have its upper end connected to the upper end of the coil 28a which extends downwardly and has its lower end connected to the lower end of the coil 28b, which latter coil in turn extends upwardly and is connected by means of a suitable fitting 28c and a threaded boss 17a formed on the wall 17 with a tube 29 that extends downwardly adjacent to the wall 17 and terminates near the bottom of the compartment A of the container 13. The dividing wall 15 between the compartments A and B is provided within the compartment A with a supporting shelf 15a having a downwardly inclined passage therethrough which receives a suitable fitting 15c that interconnects a tube 30 in the compartment A extending downwardly to adjacent the bottom thereof, and a tube 30a which extends downwardly in the compartment B to adjacent the bottom thereof. The wall 15 above the shelf 15a is provided with a boss 15b threaded to receive one end of an elbow 31, the opposite end of said elbow having threadedly attached thereto a sleeve 32 preferably formed of bakelite and closed at its lower end by a removable cap 33 which is provided with a centrally disposed opening 33a. The sleeve 32 adjacent its upper end has a partition 32a, formed therein which abuts against the end of the elbow 31 and is provided with a tapered valve seat 32b for a purpose later to be explained. The sleeve 32 is also provided intermediate its ends with small openings 32c, as clearly shown in Fig. 4.

Loosely mounted in the sleeve 32 is a cylindrical float member or sleeve 34 that is filled with cork and carries at its upper end a soft rubber gasket 34a which projects through an opening in the end of the sleeve 34 and is adapted in a certain position of the sleeve to seat in the tapered valve seat 32b and seal the passage through the elbow 31.

The cover 19 is provided with a tapped opening above the compartment B and a bakelite sleeve 35 identical with the sleeve 32 in the compartment A is screwed into the opening and projects downwardly into the compartment B, but has its enlarged upper end located above the cover 19. The lower end of the sleeve 35 is closed by a removable cap 36 having an opening 37 formed centrally therein, while adjacent the upper end of the sleeve and within the same there is a transverse partition 38 corresponding to the partition 32a and provided with a tapered valve seat into which seats the rubber gasket 39 mounted at the upper end of the cylindrical cork filled member 40 arranged in the sleeve and identical with the float member 34 previously described. The sleeve 35 intermediate its ends is provided with openings 35a, as clearly illustrated in Fig. 4. The threaded counter-bore at the outer end of the sleeve 35 has screwed therein the threaded end of a pressure relief valve 41 of suitable construction and which can be adjusted to open automatically at a predetermined pressure. The container 13 adjacent the lower end thereof is provided with a boss 42 having a threaded bore therethrough and communicating with the compartment B and into which a suitable fitting can be screwed connecting a suitable conduit or tube to the container and leading to a faucet or tap located in a convenient position.

The functioning of the device is as follows: The beer or beverage flows from the keg or container under suitable pressure supplied to the beverage or beer and to the container in a well known manner and enters the coil 28, it being noted that the diameter of the tubing forming the coil 28 is relatively small, and hence the flow of the beer therethrough will be slowed down. The beer flows upwardly through the coil 28 and thence downwardly through the coil 28a and upwardly through the coil 28b and into the tube 29, from the lower end of which it passes into the compartment A which, as has been explained, extends from adjacent the top of the compartment to adjacent the bottom thereof.

It will be understood that although three coils have been illustrated herein that a different number might be employed if desired, and it will be further understood that the device is mounted in a suitable coolant receptacle and that the coolant surrounds the coils and quickly chills the beer as it passes therethrough. As the beer enters the compartment A this compartment gradually fills and the gas in the beer or beverage rises to the top of the compartment, but is permitted to escape through the openings 32c and the sleeve 32 into the elbow 31 and thence into compartment B. Only gas will escape from compartment A to compartment B as compartment A is filling with the beer, but as soon as the beer has risen sufficiently far in compartment A the float member 34 will rise and the gasket 34a will seat in the valve seat 32b, at which time the passage of gas from compartment A into compartment B ceases.

It will also be observed that the closing of the valve seat 32b prevents the passage of beer through the elbow 31 into the compartment B. When the valve 34a is closed a gas pressure will be created in the compartment A above the beer and this pressure will force the beer upwardly from compartment A through the tube 30 and thence downwardly through the tube 30a into compartment B, such passage of the beer from compartment A into compartment B being in effect a syphoning action. The relief valve 41 is set for a predetermined pressure, and as the beer enters compartment B said valve will open and close to allow excess pressure to vent to the atmosphere. As soon as the level of the beer in compartment B reaches the float member 40 the latter is raised upwardly with the beer until the gasket 39 seats in the valve seat in the partition 38 and prevents the escape of further pressure as well as the escape of beer. When the tap or faucet connected to the lower end of the compartment B is open to withdraw the beer the compartment B will be constantly replenished by beer entering it from the compartment A, and the latter compartment will be replenished by beer entering it from the keg or barrel.

After the valve 34a in the compartment A has been closed the gas continues to rise to the top of the compartment until a pressure is created therein as great as the pressure which is sending the beer from the keg or barrel into the compartment, and when this condition is obtained the flow of beer into the compartment A ceases. As previously stated, when the compartment B is filling with beer the gas rising in the compartment will mix with the gas escaping from the compartment A and such pressure above a given point will escape through the vent valve into the air until this pressure is reduced to an amount permitting the beer to contact the float valve and close the passage to the vent valve. This predetermined pressure will remain at the upper end of the compartment B until all the beer is withdrawn from the barrel and each glass of beer withdrawn from the device will have an equal amount of gas pressure entering it to produce an equal amount of foam thereon. The air vent or relief valve 41 once the beer in compartment B has risen to close the float valve will not operate again until a new barrel of beer is tapped and then only until compartment A is filled with beer and a pressure has been created at the upper end of compartment A equal to the pressure forcing the beer into the compartment.

Inasmuch as the pressure in compartment A during the operation of the device and the withdrawing of beer therefrom will be as great as the pressure in the barrel or keg, the beer flowing from compartment A into compartment B will enter under a normal flow similar to a syphon and without creating excessive speed in the beer when the faucet is open to withdraw the same.

Irrespective of what the pressures may be in the barrel or keg and in compartment A the beer in compartment B will not be affected.

It is to be understood that although a specific embodiment of the invention has been illustrated and described herein, that the invention is not to be limited thereto except insofar as the scope of the appended claims so limits it.

Having thus described my invention I claim:

1. A beer dispenser comprising a container provided with a pair of compartments, a tube extending from adjacent the bottom of one of said compartments to adjacent the bottom of the other compartment, a conduit interconnecting the upper ends of said compartments and provided in the first mentioned compartment with a float valve, a beer inlet connected with said first mentioned compartment, a pressure relief valve associated with the second mentioned compartment, and a beer outlet adjacent the lower end of said second mentioned compartment.

2. A beer dispenser comprising a container provided with a pair of compartments, a tube extending from adjacent the bottom of one of said compartments to adjacent the bottom of the other compartment, a conduit interconnecting the upper ends of said compartments and provided in the first mentioned compartment with a float valve, a beer inlet tube entering said first mentioned compartment adjacent its upper end and extending downwardly thereof to adjacent its lower end, a pressure relief valve associated with the second mentioned compartment, and a beer outlet adjacent the lower end of said second mentioned compartment.

3. A beer dispenser comprising a container provided with a pair of compartments, a tube extending from adjacent the bottom of one of said compartments to adjacent the bottom of the other compartment, a conduit interconnecting the upper ends of said compartments and provided in the first mentioned compartment with a float valve, a beer inlet connecting the first mentioned compartment to a source of supply, a pressure relief valve associated with the second mentioned compartment, a float valve in said second mentioned compartment for closing the passage to said pressure relief valve, and a beer outlet adjacent the lower end of said second mentioned compartment.

4. A beer dispenser comprising a container provided with a plurality of compartments, a tube extending from adjacent the bottom of each of said compartments except the last one to adjacent the bottom of the adjacent compartment, a conduit connecting the upper ends of adjacent compartments and provided in the first of said adjacent compartments with a float valve, a beer inlet connected with the first of the compartments, a pressure relief valve associated with the last of the compartments and a beer outlet adjacent the lower end of the last of said compartments.

AUGUST L. VOIGHT.